United States Patent [19]

Robinson

[11] Patent Number: 5,785,001
[45] Date of Patent: Jul. 28, 1998

[54] PET LITTER BOX HAVING EXTENDIBLE SIDES

[75] Inventor: Jerry W. Robinson, Golden Valley, Minn.

[73] Assignee: Pathfinder Innovation, Inc., Minneapolis, Minn.

[21] Appl. No.: 606,925

[22] Filed: Feb. 26, 1996

[51] Int. Cl.$^6$ ............................................. A01K 1/035
[52] U.S. Cl. ............................ 119/168; 299/101; 299/103
[58] Field of Search ............................ 119/168, 499; 229/101, 103; 206/45.21, 45.23

[56] References Cited

U.S. PATENT DOCUMENTS

| | | | |
|---|---|---|---|
| 1,125,535 | 1/1915 | Hoffman | 229/101 |
| 2,167,947 | 8/1939 | Hayes | 206/45.21 |
| 3,377,990 | 4/1968 | Mitchell | 119/165 |
| 3,745,975 | 7/1973 | Prucha | 119/165 |
| 4,171,680 | 10/1979 | Silver et al. | 119/165 |
| 4,548,160 | 10/1985 | Feitelson | 119/168 |
| 4,627,381 | 12/1986 | Reed et al. | 119/165 |
| 4,627,382 | 12/1986 | Muzzey | 119/165 |
| 4,706,606 | 11/1987 | Coppola | 119/165 |
| 4,732,111 | 3/1988 | Runion | 119/165 |
| 4,760,816 | 8/1988 | Rhodes | 119/168 |
| 4,779,567 | 10/1988 | Smith | 119/165 |
| 4,807,563 | 2/1989 | Berry et al. | 119/168 |
| 4,884,526 | 12/1989 | Giannakopoulos | 119/165 |
| 5,007,530 | 4/1991 | Weismantel | 206/45.23 X |
| 5,035,205 | 7/1991 | Schiller et al. | 119/168 |
| 5,123,381 | 6/1992 | Salmon | 119/165 |
| 5,476,067 | 12/1995 | Queen et al. | 119/168 |

*Primary Examiner*—Robert P. Swiatek
*Assistant Examiner*—Elizabeth Shaw
*Attorney, Agent, or Firm*—Westman, Champlin & Kelly, P.A.

[57] ABSTRACT

A litter box includes first and second generally opposed side walls and third and fourth generally opposed side walls. The third and fourth side walls are coupled at opposite ends to the first and second side walls. A bottom closure is connected to the first, second, third and fourth side walls to form a container having an opening. A top closure is foldable to close the opening and foldable to provide an extended wall section extending above the opening.

18 Claims, 10 Drawing Sheets

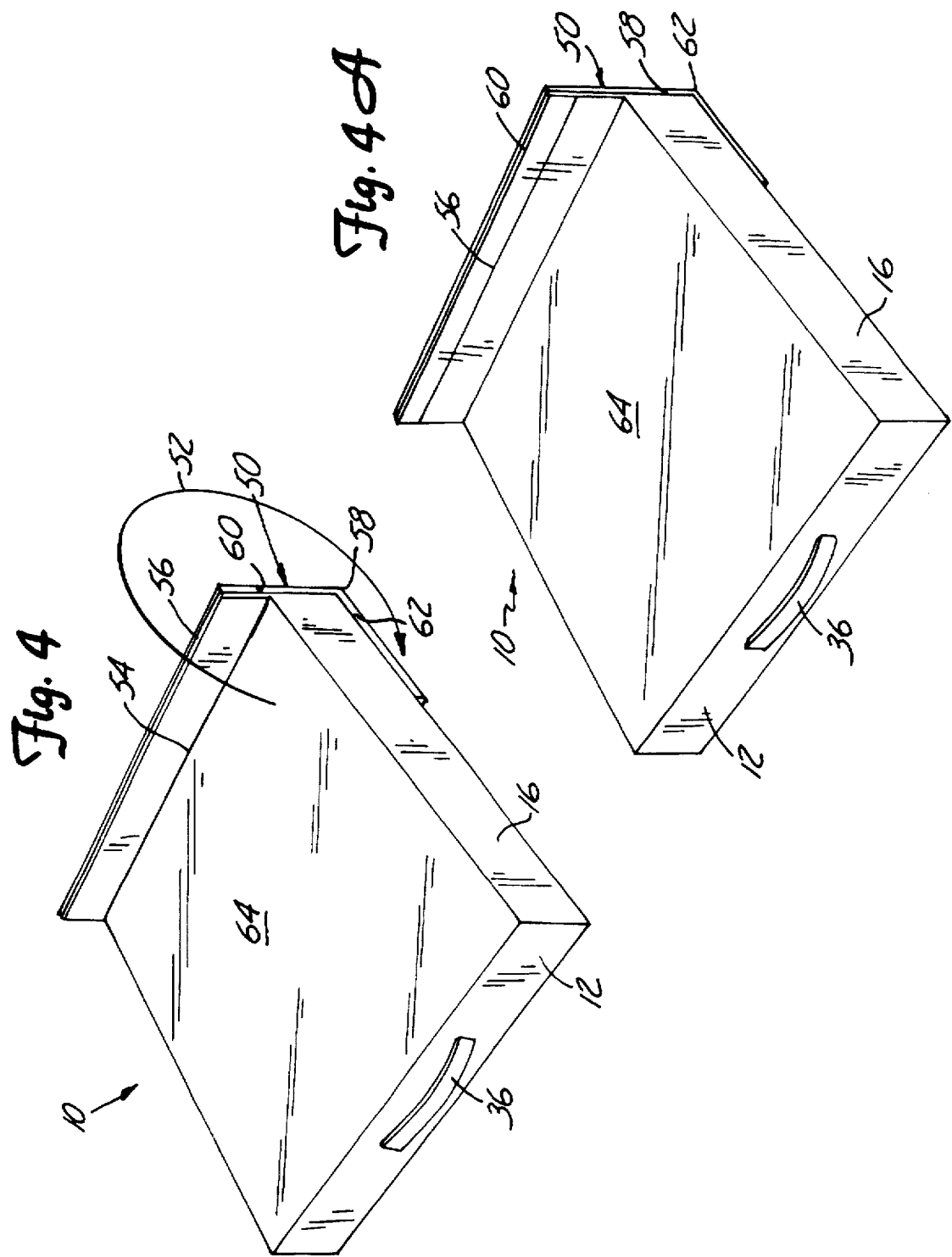

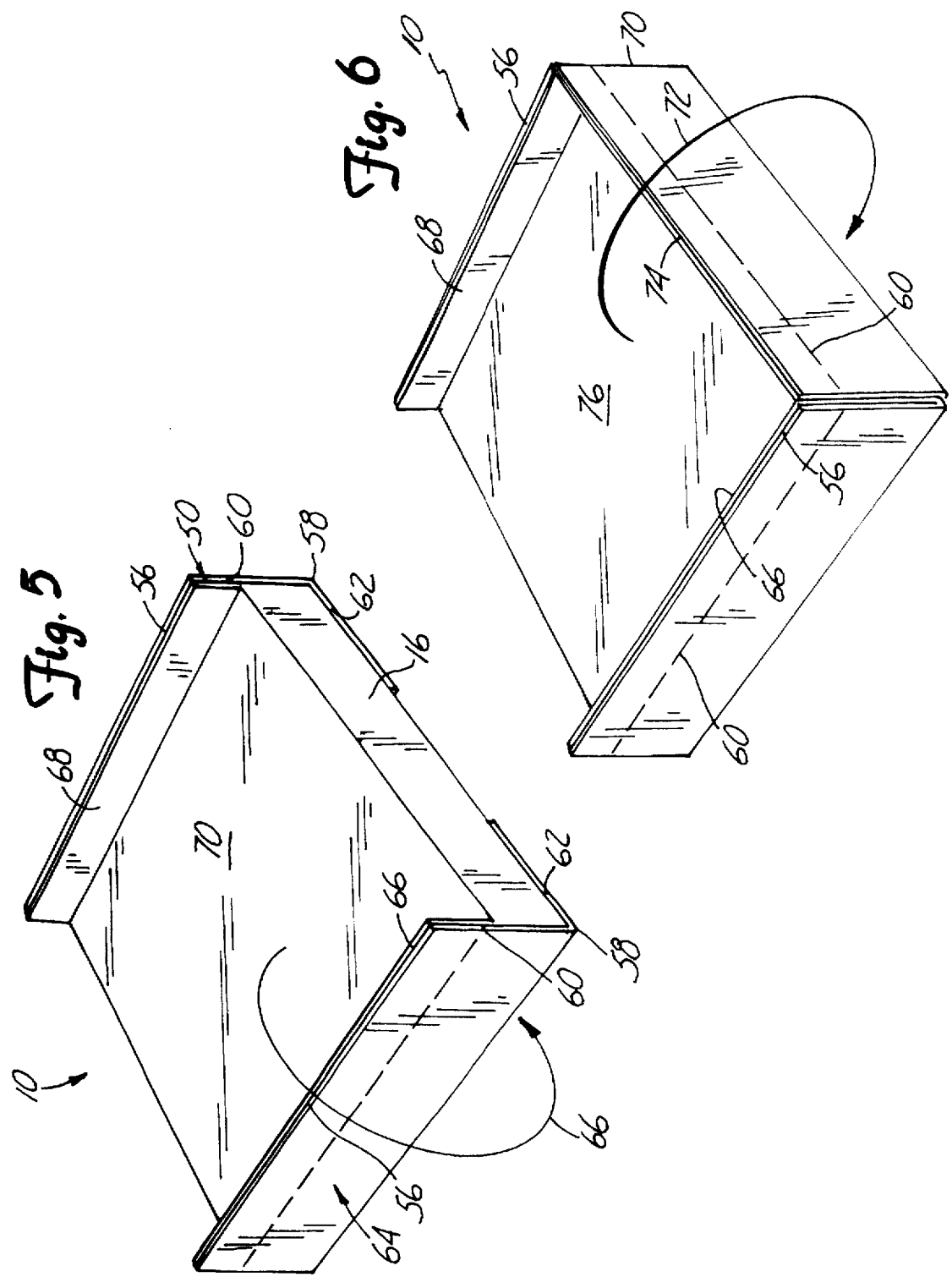

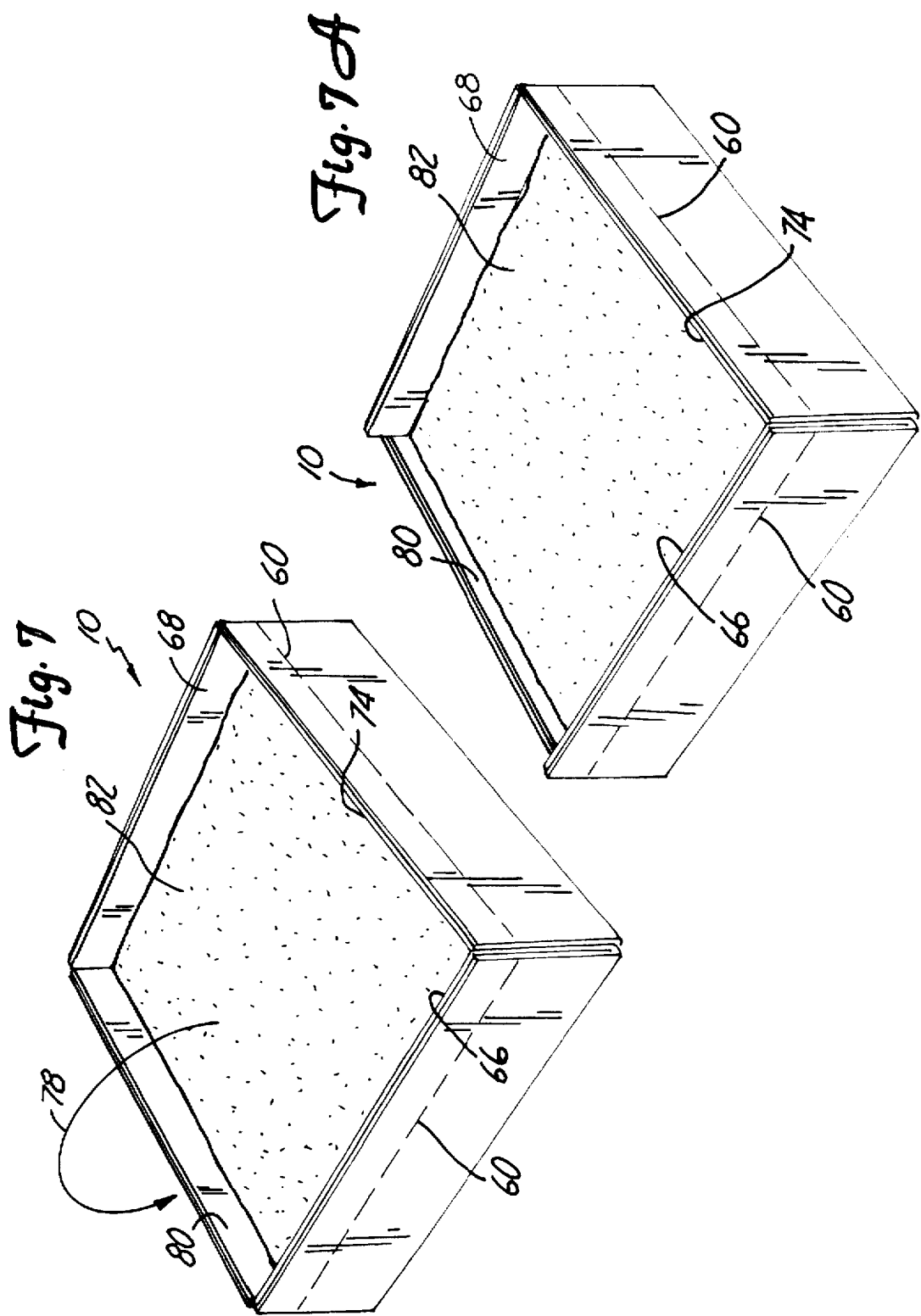

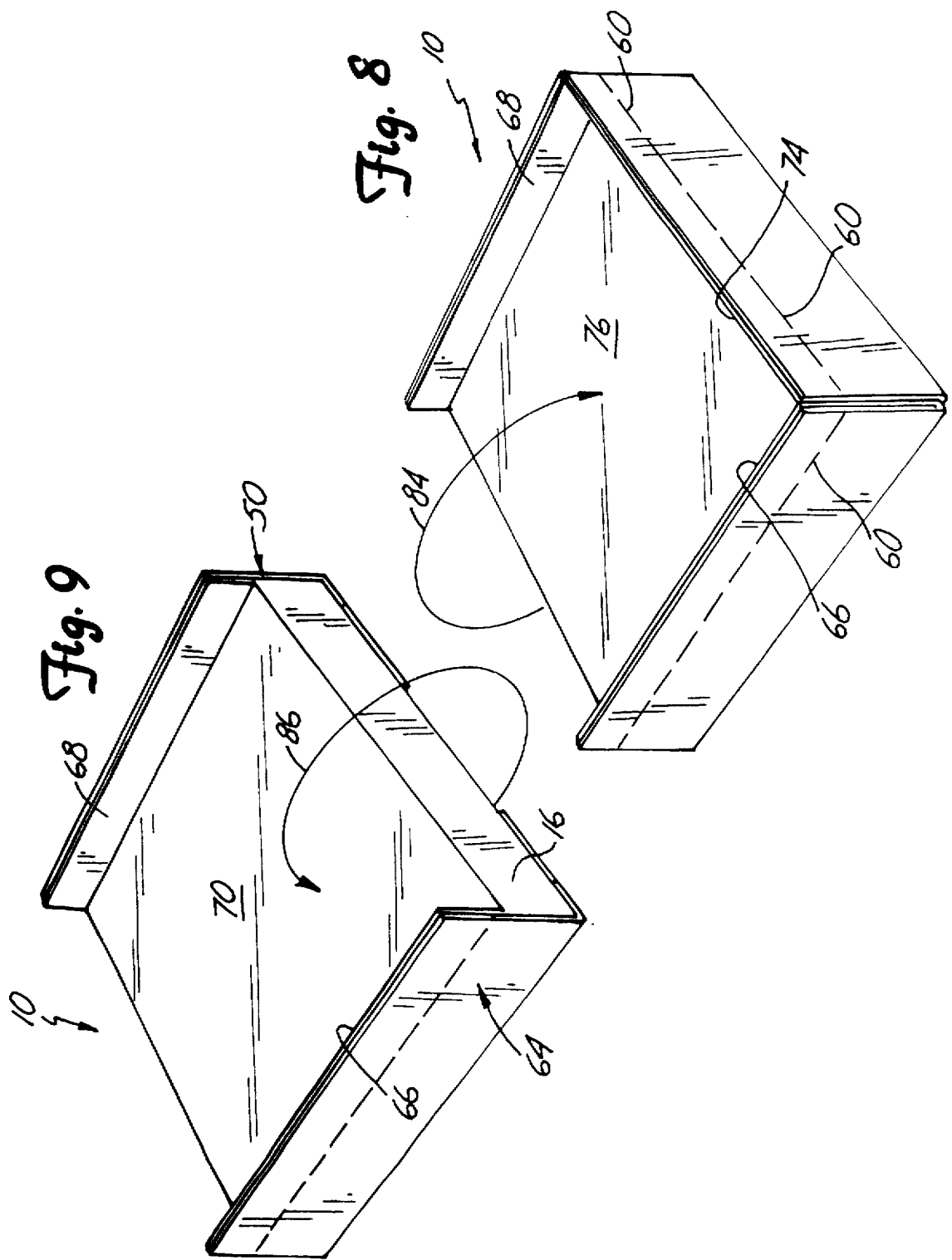

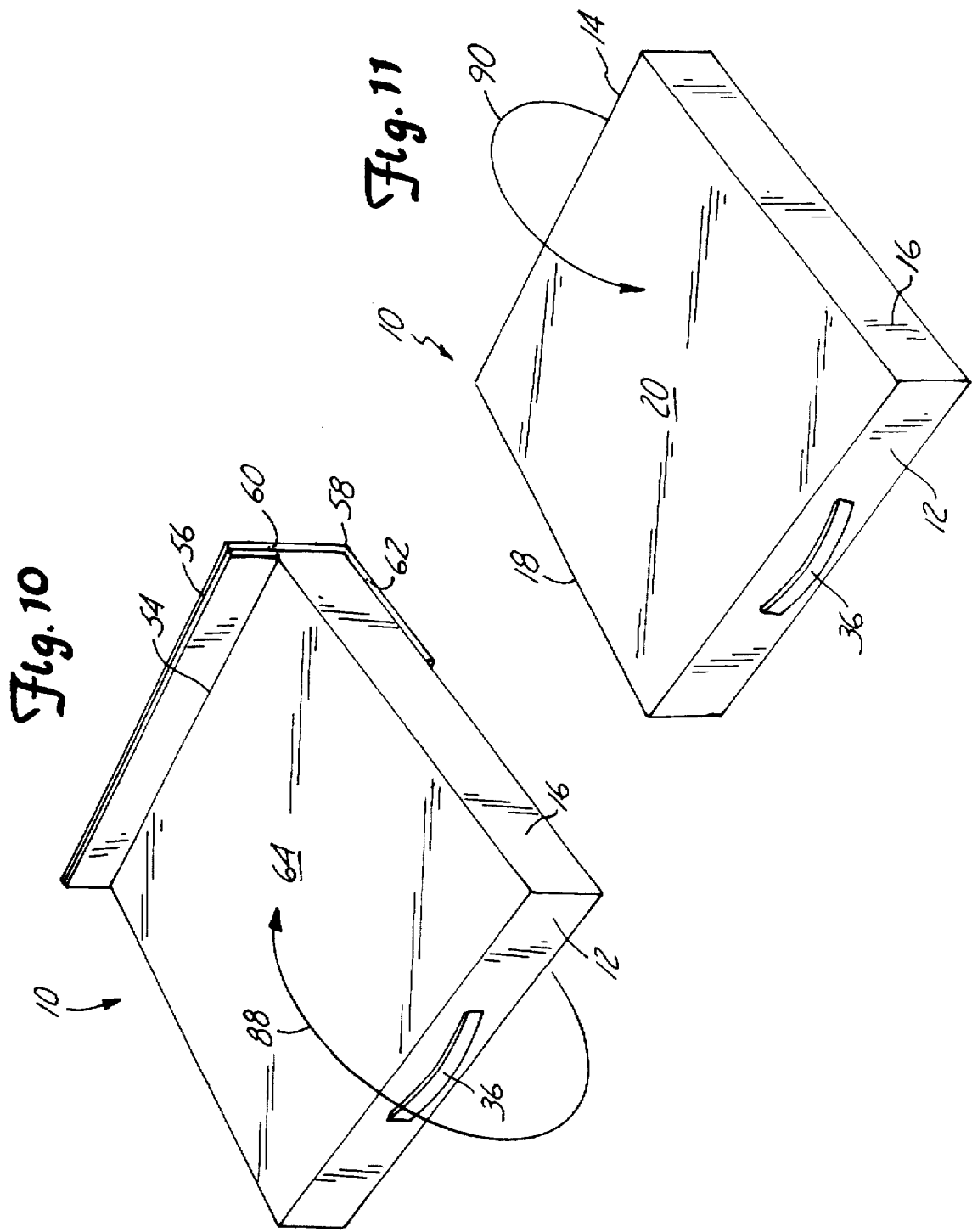

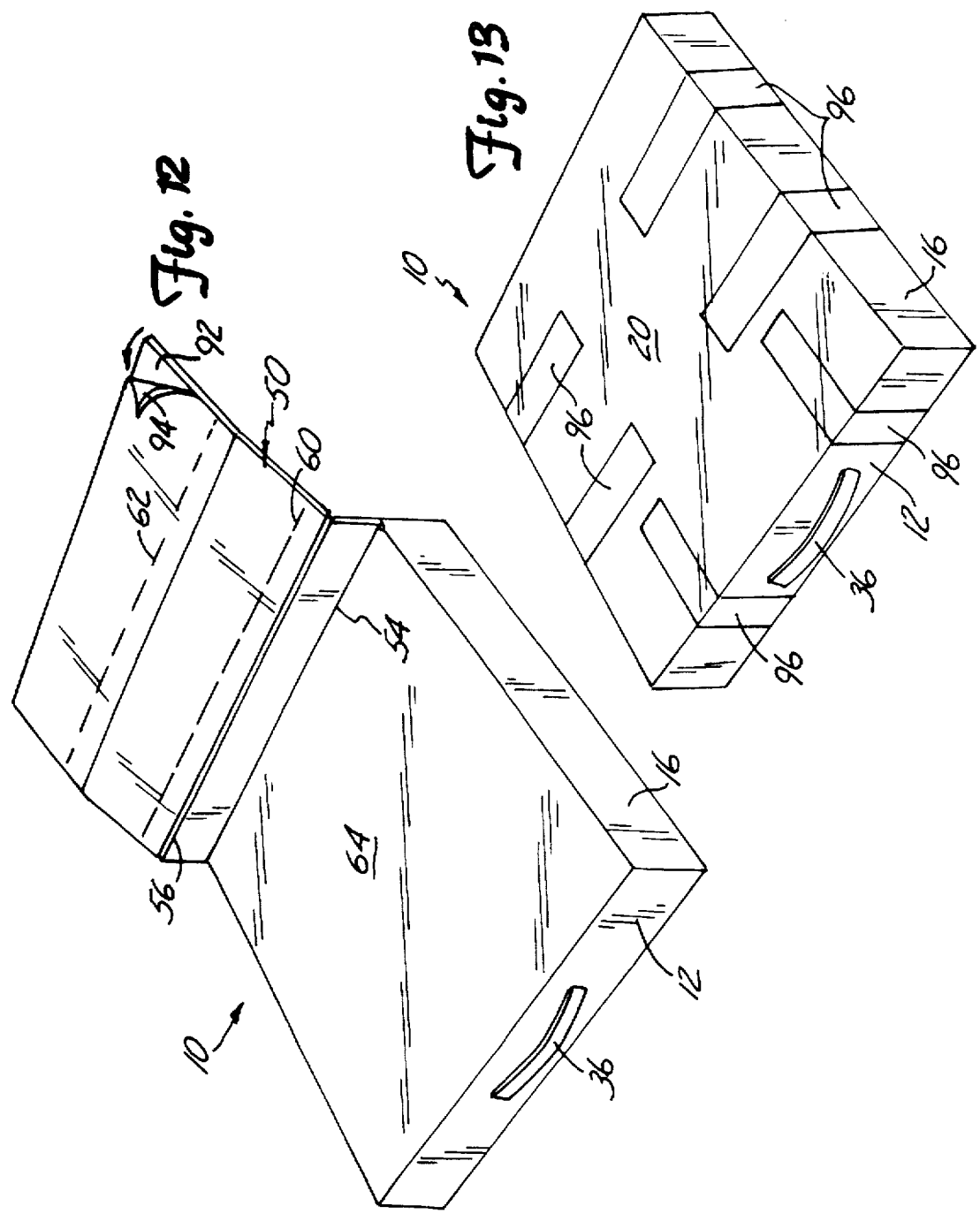

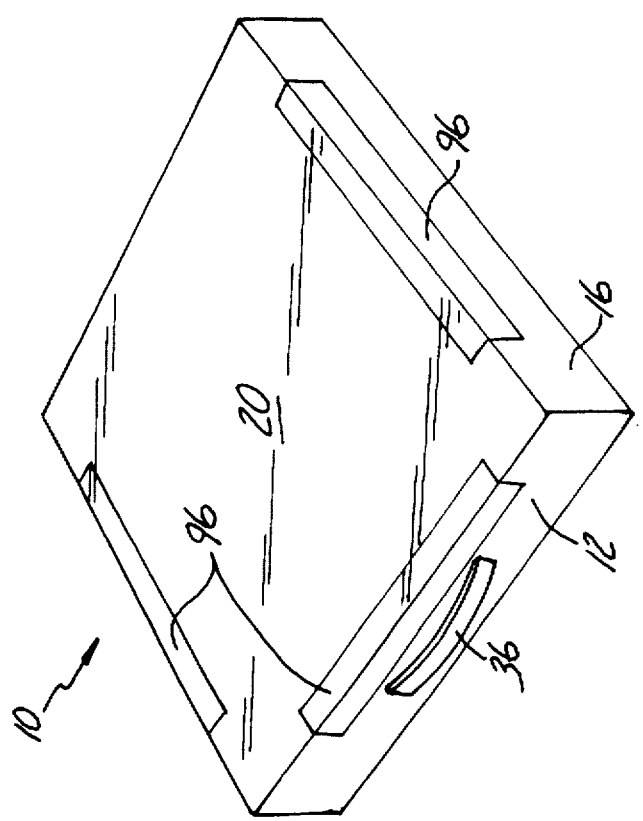

PET LITTER BOX HAVING EXTENDIBLE SIDES

BACKGROUND OF THE INVENTION

The present invention deals with litter boxes. More specifically, the present invention deals with a pet litter box having extendible side wall portions.

Pet litter is typically formed of a granular material such as sand, or such as a clay-based material. The clay-based material typically swells to absorb moisture from animal waste deposited therein. Both the sand and clay-based material are used in absorbing moisture and odors which can accompany animal waste. The granular nature of the material allows the animals to move the material about with their paws to cover and bury their waste.

Pet litter is conventionally packaged in 25 to 50 pound flexible paper bags. Such packaging has a number of problems. The flexible bags are heavy and difficult to grasp and often require two hands to lift. Further, such bags typically have no handles and are thus quite cumbersome. Also, the bags can accidentally tear, allowing the granular litter material to spill.

Further, the bags are often simply piled in retail stores where they are sold to the end user customers. Piles of such bags yield an unwieldy appearance in the store. Additionally, such piles of bags are often surrounded by spilled litter from bags in the pile which have been accidentally torn. All of these factors are undesirable for the merchandiser selling the litter. Also, the irregular shape of such bags makes it difficult for the manufacturer of such litter to effectively use the sides of the bags for advertising or promotional material.

Such bagged litter is not only undesirable from the merchandiser's or retailer's standpoint, it is also undesirable and unhealthy from the eventual end user's standpoint. The awkward and cumbersome nature of the bags makes it difficult to transport the bags to and from the automobile in which the customer often carries such bags. The risk of accidentally tearing the bags and encountering spillage follows the customer as well as the retailer.

Not only is the litter packaging material undesirable, but also current methods of utilizing pet litter are undesirable. Pet owners conventionally use reusable litter trays made from a washable material such as plastic. The trays have sides ranging from three to eight inches in height and are provided with such sides in an attempt to prevent litter from being scattered outside of the tray when pets paw the litter material. This methodology has certain distinct drawbacks. Removing soiled litter from the litter tray can be a messy, unpleasant, unsanitary and potentially unhealthy task. The pet owner must typically lift the heavy litter tray (containing litter soiled with animal urine and feces) and pour the contents of the tray into a trash container such as a plastic trash bag. Even when great care is exercised by the pet owner, there is a substantial risk of accidentally spilling the soiled litter, or accidentally tearing the trash bag causing soiled litter to spill. Further, the process of emptying the litter tray disturbs the soiled litter, resulting in unpleasant odors, dust, and airborne pollutants. Litter soiled with animal urine and feces can pose a health risk to people. In fact this is widely recognized.

Even if successfully emptied of soiled litter, the methodology of using a reusable tray is still undesirable. The litter tray must be thoroughly washed with cleansers such as hot water and ammonia to remove the animal waste residue and to sanitize the tray. In an effort to expedite this process, some pet owners cover the bottom and sides of such litter trays with a plastic or paper liner. This liner needs to be carefully disposed of. Even with such a liner, the tray often comes into contact with animal urine and fecal material. Therefore, the tray should be cleaned and sanitized even when such liners are used. The process of cleaning and sanitizing the tray again exposes the pet owner to potentially hazardous waste materials.

Once the tray is clean, in order to reuse the tray, it must be refilled with litter. Pouring new litter into a litter tray poses additional problems. The new bag of cat litter must be transported to the location of the reusable tray. This, as stated above, can be unwieldy and cumbersome. Further, the bag must then by opened typically by perforation of some type. This poses the risk of accidentally spilling the granular litter material on the floor. In addition, the process of pouring the granular litter material into the reusable tray often results in the production of airborne dust particles. Any unused litter must be stored within the bag. The threat of spillage and airborne litter particles is thus ever present.

SUMMARY OF THE INVENTION

A litter box includes first and second generally opposed side walls and third and fourth generally opposed side walls. The third and fourth side walls are coupled at opposite ends to the first and second side walls. A bottom closure is connected to the first, second, third and fourth side walls to form a container having an opening. A top closure is foldable to close the opening and alternatively provide an extended wall section extending above the opening.

BRIEF DESCRIPTION OF THE DRAWINGS

FIGS. 2–7A illustrate opening of the pet litter containment system shown in FIGS. 1A–1C.

FIGS. 8–11 show the closing of the litter containment system shown in FIGS. 1A–1C.

FIG. 12 shows one embodiment of a sealing arrangement for resealing the litter containment system.

FIG. 13 shows a second embodiment of a sealing arrangement for resealing the litter containment system.

FIG. 14 shows a third embodiment of a sealing arrangement for resealing the litter containment system.

DETAILED DESCRIPTION OF THE PREFERRED EMBODIMENTS

Figure 1:
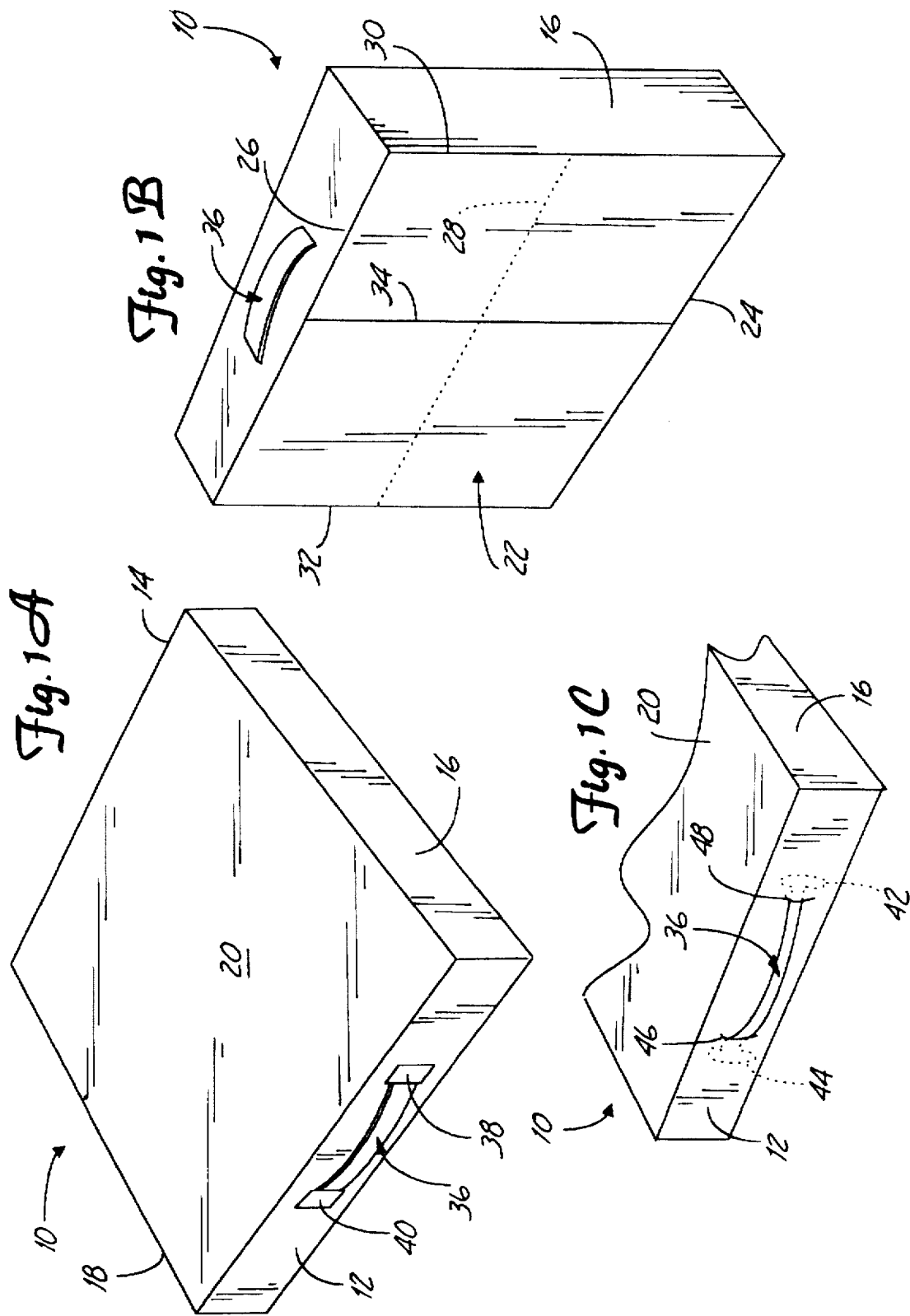
FIGS. 1A, 1B and 1C are front and side elevational views, respectively, of a pet litter containment system according to the present invention.

FIGS. 1A, 1B and 1C are perspective views of pet litter containment system or box 10 according to the present invention. Pet litter containment system 10 includes first and second generally opposed side panels 12 and 14, and third and fourth generally opposed side panels 16 and 18. Pet litter containment system 10 also includes a top closure 20 and a bottom closure 22. The components of system 10 are preferably formed of a sturdy material, such as corrugated cardboard or plastic. In the embodiment in which system 10 is formed of corrugated cardboard, it is preferably lined with a moisture-resistant material such that any urine, or fecal material which contains moisture, is contained within the box. This also helps prevent deterioration of the box material during use.

Generally opposed sides 12 and 14 and generally opposed sides 16 and 18 are fastened together in a conventional method, such as being formed of an integral material which is bent or folded, or such as by appropriately applied adhesive to adjoining sections.

Bottom closure 22 preferably includes a plurality of flaps of the box material which are foldable into the closed position shown in FIGS. 1A and 1B. The flaps can be arranged in any suitable, known orientation, such as a pair of flaps which fold along hinge sections 24 and 26 to become aligned generally along seam 28, shown in phantom in FIG. 1B, and two other flap portions which fold along hinge areas 30 and 32 to generally abut one another along seam 34. The flap portions are typically held against one another by adhesive, or adhesive tape, or any similar closure system.

Alternatively, closure 22 could include two or more flaps each of which has an outer peripheral dimension which is the same as the total area of closure 22. These flaps are folded over one another to close the bottom of containment system 10.

Panel section 12 also preferably has a handle 36 disposed thereon. Handle 36 can be any suitable handle, such as a plastic or other polymer material attached to panel section 12. In one embodiment, handle 36 simply has two connective tabs 38 and 40 which are connected by adhesive to panel section 12. In another embodiment, shown in FIG. 1C, handle 36 has a plurality of enlarged end portions 42 and 44 which are inserted through slots 46 and 48 in panel section 12. In either case, handle 36 is arranged to be suitable to support the weight of system 10 when it is fully loaded with pet litter.

Figure 2:
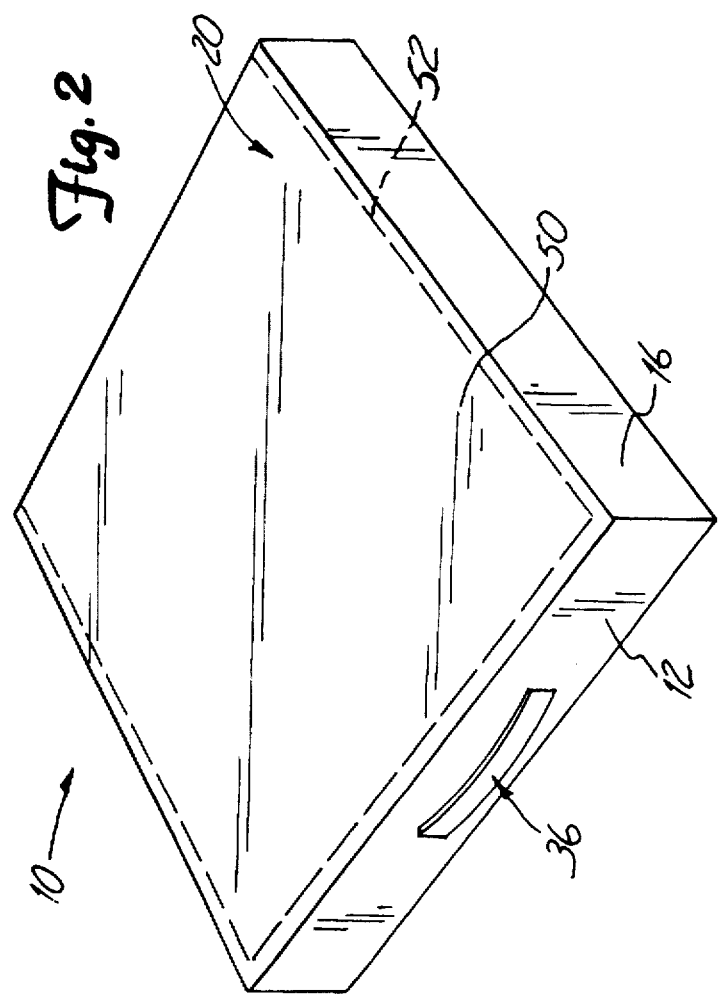

The arrangement of top closure 20 is set out in more detail in FIGS. 2–12. FIG. 2 shows that top closure 20 has at least a first panel 50 which is sealed to the remainder of containment system 10 by a removable seal 52, shown in phantom in FIG. 2. Removable seal 52 can be any commercially available, and generally known removable seal mechanism, such as removable adhesive tape, or pull strings which, when pulled, disengage three of the four sides of top panel 50 from the remainder of closure system 10. This disengagement is the first step in opening containment system 10.

Figure 3:
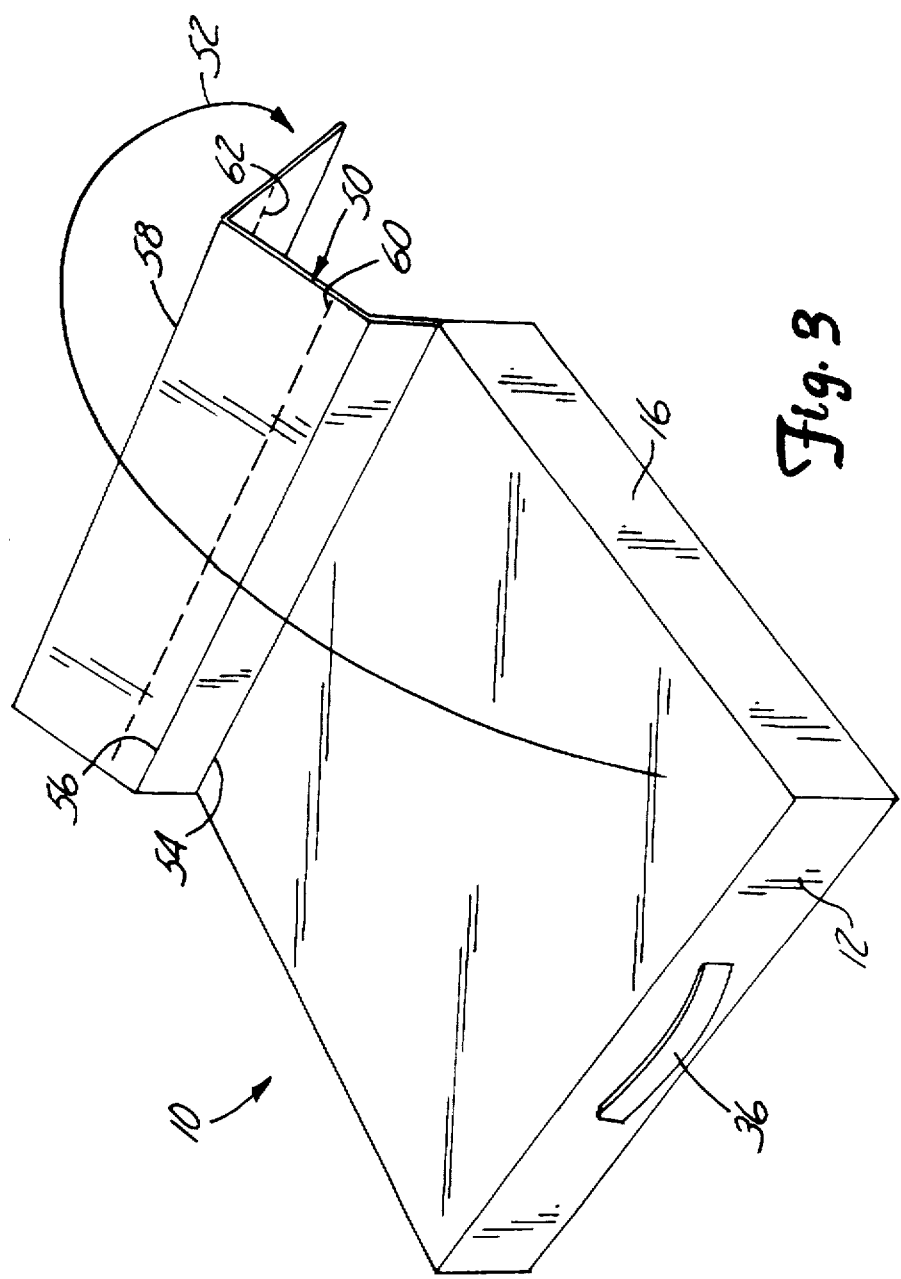

FIG. 3 illustrates a second step in opening containment system 10. Once the three sides of panel 50 are disengaged from the remainder of panel system 10, panel 50 is pulled back in a direction illustrated by arrow 52. Panel 50 is provided with pre-scored, or predepressed fold lines 54, 56 and 58. The fold lines act as hinges such that sections of panel 50 can pivot or fold relative to one another. In one preferred embodiment, panel section 50 is also provided with a second set of pre-scored or pre-depressed fold lines 60 and 62. This second set of fold lines can be used in folding open panel section 50, and this will be described in greater detail later in the specification.

FIG. 4 shows the next step in opening containment system 10. Panel section 50 is folded about fold lines 56 and 58 such that a distal portion of panel section 50 is folded beneath the remainder of containment system 10. FIG. 4 illustrates that hinge 54 is separated from hinge 56. Therefore, when panel section 50 is folded as shown in FIG. 4, a portion of the panel section extends upwardly from hinge 54, away from the remainder of containment system 10 to form an upwardly extending ridge or barrier.

FIG. 4A shows panel section 50 folded in a similar manner. However, rather than being folded along fold lines or hinges 56 and 58, panel section 50 is folded along fold lines 60 and 62. Thus, the ridge or barrier section formed by the portion of panel section 50 between fold lines 54 and 60 is taller than that between fold lines 54 and 56. FIG. 4 also shows that another panel section 64 is exposed once panel section 50 is folded back and under the remainder of containment system 10.

FIG. 5 illustrates the next step in opening containment system 10. FIG. 5 illustrates that panel section 64 is folded in a direction indicated by arrow 65. This step is similar to the step illustrated by FIG. 4 in that panel section 64 preferably has a plurality of fold lines to make the barrier or ridge section extending away from containment system 10 that has a height which is selectable. For the sake of clarity, the fold lines in panel section 50 are numbered the same as those in panel section 64. Thus, after the step shown in FIG. 5, containment system 10 has a pair of oppositely disposed ridges or barrier sections 66 and 68. FIG. 5 also illustrates that once panel sections 50 and 64 are removed, a third panel section 70 is exposed.

FIG. 6 indicates the next step in opening containment system 10. In this step, top panel section 70 is folded in a similar fashion to panel sections 50 and 64 shown in FIGS. 4 and 5, respectively. The difference is that panel section 70 is folded in a direction indicated by arrow 72. As with panel sections 50 and 64, panel section 70 preferably has a plurality of sets of fold lines (which are similarly numbered to those in panel sections 50 and 64). Once the step illustrated by FIG. 6 is performed, containment system 10 has three ridge sections or barrier sections 66, 68 and 74 which extend up and away from the remainder of containment system 10. FIG. 6 also illustrates that a fourth top panel section 76 is exposed once the three previous panel sections 50, 64 and 70 have been folded away.

FIG. 7 illustrates the next step in opening containment system 10. In the step shown in FIG. 7, panel section 76 is folded back in a similar fashion to panel sections 50, 64 and 70, except that it is folded in a direction indicated by arrow 78. As with the other top panel sections, panel section 76 also preferably has a plurality of sets of fold lines so that the height of the barrier segment 80 formed by panel section 76 is selectable or variable.

FIG. 7 illustrates that, once containment system 10 is completely opened, it has four barrier segments 66, 68, 74 and 80 which abut one another to form a substantially continuous upwardly extending ridge or barrier. This barrier is highly useful in preventing litter contained in containment system 10 from being scattered by the pawing of the pet using containment system 10.

FIG. 7 also shows that containment system 10 is provided with pet litter 82. In the preferred embodiment, pet litter 82 is placed within containment system 10 prior to it being sold. However, containment system 10 can also be manufactured and sold separately, and the pet litter 82 can be placed in containment system 10 after it is opened. In either case, the pet litter 82 is contained within containment system 10 and the upwardly extending ridge portions extend up and away from litter 82.

FIG. 7A shows a second embodiment of containment system 10 according to the present invention. FIG. 7A shows that containment system 10 still has four barrier segments 66, 68, 74 and 80. However, rather than forming one substantially upwardly extending ridge or barrier, barrier segment 80 is folded into the arrangement in which it has a lower profile than the other barrier segments. Thus, containment system 10 has three sides which have higher profile barriers, and one side which has a lower profile barrier. This arrangement provides a great deal of protection against litter scatter on the three sides which have the high profile barriers. This arrangement also allows ease of pet entry on the side having the lower profile barrier segment.

FIGS. 8–11 illustrate the process used in closing containment system 10. FIG. 8 illustrates that the first step in closing containment system 10 is to fold panel 76 back in a direction indicated by arrow 84 which is generally opposite the direction indicated by arrow 78 shown in FIG. 7. Once flap 76 is folded in this manner, flap 70 is returned to its closed position. This is indicated in FIG. 9. Flap 70 is folded back in a direction indicated by arrow 86. This direction is generally opposite the direction indicated by arrow 72 in FIG. 6. FIG. 10 illustrates that panel section 64 is then folded back in the direction indicated by arrow 88, generally opposite the direction indicated by arrow 67 in FIG. 5. It will be noted that this step exposes or reveals handle 36.

FIG. 11 shows the next step performed in closing containment system 10. In this step, panel 50 is folded back in a direction indicated by arrow 90. This is generally opposite the direction indicated by arrow 52 in FIG. 4. This substantially completes the closing sequence used in closing containment system 10. It should be noted that, once this step is complete, containment system 10 is substantially back in the same position it was in prior to being opened.

The next preferred step in using system 10 is to reseal system 10 so that the pet litter cannot escape from the system. FIG. 12 illustrates one embodiment used in resealing containment system 10. FIG. 12 illustrates that the underside of panel section 50 is provided with an adhesive 92 which has a peel-off adhesive backing material 94. Adhesive 92 and backing 94 are preferably disposed on the entire lower surface of panel section 50, but may be disposed only around its periphery, or about another suitable portion for resealing containment system 10. The adhesive material can be any suitable form of commercially available adhesive.

FIG. 13 shows a second embodiment used in resealing containment system 10. In this embodiment, adhesive strips are provided either with, or within, containment system 10 during manufacture of containment system 10. Then, once the user desires to reseal containment system 10, the adhesive strips 96 (which are preferably provided with a peel-off backing) are used and placed about containment system 10 as shown in FIG. 13, or in any other suitable arrangement.

FIG. 14 simply illustrates another arrangement in which adhesive strips or tape portions are used in sealing containment system 10.

Therefore, the present invention provides a fully self-contained pet litter system which substantially eliminates problems associated with prior bag-type litter systems. Litter can either be placed in containment system 10 once it is opened, or it can be placed in containment system 10 during manufacture of containment system 10. In either case, the used or soiled litter is never removed from containment system 10. Containment system 10 is simply resealed and the entire containment system is discarded. Also, containment system 10 has prescored fold lines or other hinge-type arrangements in the top closure such that an upwardly extending barrier or ridge is formed about the pet litter within containment system 10. This significantly reduces the likelihood that any of the pet litter will be expelled from containment system 10 during use. In one embodiment, a plurality of sets of hinges are provided to facilitate forming a barrier having a selectable height. This provides an adaptable system which can be configured with high profile barrier segments, low profile barrier segments or a combination thereof for ease of pet entry. Further, containment system 10 is a box which is substantially rigid as compared with prior bags which contain litter. This is significantly easier to store and makes for a much neater and cleaner appearance than stacked bags in the merchandiser's facility.

Also, the flat surface of containment system 10 provide a greater area upon which to display advertisements or marketing material. Containment system 10 includes a handle 36 which makes containment system 10 very easy to transport both while purchasing containment system 10, and while discarding containment system 10. Thus, containment system 10 is substantially improved over prior pet litter systems.

Although the present invention has been described with reference to preferred embodiments, workers skilled in the art will recognize that changes may be made in form and detail without departing from the spirit and scope of the invention.

What is claimed is:

1. A litter containment system, comprising:

first and second generally opposed side walls;

third and fourth generally opposed side walls, the third and fourth side walls being coupled at opposite ends to the first and second side walls;

a bottom closure connected to the first, second, third and fourth side walls to form a container having an opening; and a top closure including at least one panel foldably coupled to one of said side walls at a first hinge to move between a folded position to cover the opening and an extended position to define a barrier, the at least one panel including a second hinge and a third hinge spaced from the first hinge, the second hinge being located to define first and second panel portions, the at least one panel being folded relative to the second hinge to define the height of a barrier formed by the first and second panel portions, the third hinge being spaced from the first and second hinges and the at least one panel being sized to locate the third hinge to define a third panel portion foldable under the bottom closure.

2. The device of claim 1 wherein the hinges comprise pre-scored lines.

3. The device of claim 1 wherein the second hinge comprises a plurality of hinge sections formed by the first and second panel portions so that the barrier formed by the first and second panel portions has a height which is selectable.

4. The device of claim 1 wherein the top closure includes a plurality of panels foldably coupled to a plurality of side walls.

5. The device of claim 1 wherein the first, second, third and fourth side walls and the top and bottom closures are coated with a moisture resistant material.

6. The device of claim 1 wherein one of the first, second, third and fourth side walls and top and bottom closures includes a handle extending away from the container.

7. A litter containment system, comprising:

first and second generally opposed side walls;

third and fourth generally opposed side walls, the third and fourth side walls being coupled at opposite ends to the first and second side walls;

a bottom closure connected to the first, second, third, and fourth side walls to form a container having an opening; and a top closure including at least one panel foldable coupled to one of said side walls at a first hinge to move between a folded position to cover the opening and an extended position, the at least one panel including a second hinge spaced from the first hinge and the at least one panel being foldable along the second hinge in the extended position to define an extended wall section wherein the second hinge comprises a hinge section having a plurality of selectable lines such that the extended wall section has a height which is selectable.

8. The device of claim 7 wherein the top closure further comprises:

a plurality of panels foldably coupled to a plurality of said side walls via a first hinge to cover the opening.

9. The device of claim 8 wherein a plurality of panels include second hinges spaced a similar first distance from the first hinge to define a similar height barrier and wherein the second hinges of one of said panels is spaced a second smaller distance from the first hinge to define a lower height entry.

10. The device of claim 8 wherein each of the plurality of panels includes a third hinge spaced from the first and second hinges and the panel being foldable along the second hinge to define a first panel portion extending upwardly away from the opening, and a second panel portion extending downwardly in alignment with the first panel portion and foldable along the third hinge to define a third panel portion foldable under the bottom closure.

11. The device of claim 10 wherein the third hinge comprises a hinge section having a plurality of selectable lines for folding the third panel portion under the bottom closure.

12. The device of claim 10 wherein at least one of the panels includes a securing system for resealing the opening of the container.

13. The device of claim 12 wherein the securing system includes an adhesive removably covered by a removable backing, and disposed on the at least one of the panels.

14. The device of claim 13 wherein the securing system comprises a plurality of adhesive strips securable about the panels to reseal the container.

15. A litter containment system, comprising:

first and second generally opposed side walls;

third and fourth generally opposed side walls, the third and fourth side walls being coupled at opposite ends to the first and second side walls;

a bottom closure connected to the first, second, third and fourth side walls to form a container having an opening; and a plurality of top panels foldably coupled to said container walls and foldable into a first position to cover the opening, each of the top panels including a plurality of selectable hinges said selectable hinges being spaced from the foldable connection between the container wall and top panel, the top panel being foldable along selected hinges for defining an adjustable-height barrier.

16. The device of claim 15 wherein the selectable hinges are spaced to define first, second, and third panel portions, the first and second panel portions defining the adjustable-height barrier and the third panel portion being spaced to define a portion foldable under the bottom closure.

17. The device of claim 16 wherein at least one of the top panels includes a securing system for resealing the opening of the container.

18. The device of claim 17 wherein the securing system includes an adhesive substantially covering one surface of the at least one of the top panels, the adhesive being removably covered by a removable backing.

* * * * *